No. 620,597.  
F. B. LUDELING.  
NUT AND BOLT LOCK.  
(Application filed Nov. 23, 1898.)

Patented Mar. 7, 1899.

(No Model.)

WITNESSES:  
J. F. Finch.  
M. J. Longden.

INVENTOR  
F. B. Ludeling  
BY  
ATTORNEY

UNITED STATES PATENT OFFICE.

FRANK B. LUDELING, OF MONROE, LOUISIANA.

NUT AND BOLT LOCK.

SPECIFICATION forming part of Letters Patent No. 620,597, dated March 7, 1899.

Application filed November 23, 1898. Serial No. 697,264. (No model.)

*To all whom it may concern:*

Be it known that I, FRANK B. LUDELING, a citizen of the United States, residing at Monroe, in the parish of Ouachita and State of Louisiana, have invented certain new and useful Improvements in Nut and Bolt Locks; and I do hereby declare the following to be a full, clear, and exact description of the invention, such as will enable others skilled in the art to which it appertains to make and use the same.

My invention relates to certain new and useful improvements in nut and bolt locks, and has for its object to provide a device of this description in which the bolt shall be securely locked, so that the nuts will not back on the bolt-thread; and with these ends in view my invention consists in certain details of construction and combination of parts, such as will be hereinafter fully set forth and then specifically be designated by the claim.

Figure 1:
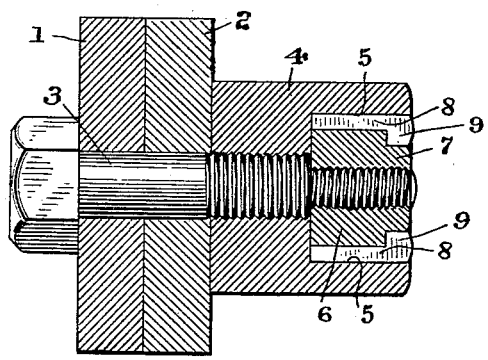
Figure 2:
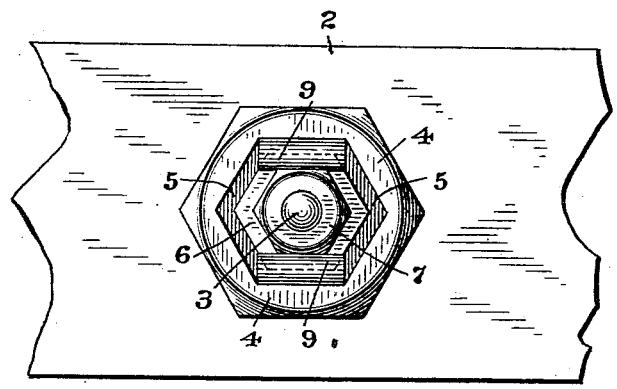

In the accompanying drawings, Figure 1 is a sectional elevation illustrating the application of my improvement, and Fig. 2 is an end elevation showing the nuts in locked position.

Similar numbers of reference denote like parts in both figures of the drawings.

Heretofore it has been common to provide main nuts and jam-nuts in devices of this description, and bolts have been equipped with right and left hand threads, and it is also old to drive one nut within the other and to lock the nuts in this position by means of pins or other devices driven into the space or spaces between the nuts; but my invention contemplates a specific and very efficient device of this character and will be best understood from the following description.

1 2 denote plates which are to be clamped together by the action of the bolt and nuts. 3 is the bolt, which passes through these plates and has a right-handed thread upon its largest diameter, while the forward end of said bolt is reduced in diameter and is provided with a left-handed thread.

4 is the main nut driven on the bolt 3 at its largest diameter against the plates, and this nut is provided with a recess 5 in its outer face.

6 is the lock and jam nut, which is driven upon the reduced end of the bolt, and this nut is of such dimensions that it will readily pass within the recess 5. This nut 6 has at its outer face a reduced wrenchhold 7, whereby it may readily be driven within said recess or withdrawn therefrom, as the occasion may demand. The shapes of the nut 6 and the recess 5 are immaterial, and therefore the nut may have any desired number of sides.

8 are pins which are driven within the space between the nut 6 and the inner walls of the recess 5, so as to completely fill said space at any desired location and thereby effectively prevent either of the nuts from turning. These pins are provided with heads 9 to facilitate their withdrawal in case the nuts are to be backed off the bolt, and these headed portions fit snugly against the nut 6 where the diameter of the latter is reduced. It will therefore be seen that the ends of the nuts and the pins are substantially in the same plane, thus presenting a very neat finish.

Having thus described my invention, what I claim as new, and desire to secure by Letters Patent, is—

In a nut and bolt lock, the combination of the bolt having two diameters provided respectively with right and left handed threads, the main nut recessed in its outer face to a depth and size sufficient to wholly contain the jam-nut and driven upon said bolt at the largest diameter of the latter, the jam-nut driven around said bolt at its smallest diameter within said recess and provided with a reduced wrenchhold, and the pins driven within said recess and between the walls of the latter and the sides of the lock-nut, substantially as set forth.

In testimony whereof I affix my signature in presence of two witnesses.

FRANK B. LUDELING.

Witnesses:
F. W. SMITH, Jr.,
M. T. LONGDEN.